(12) United States Patent
Ederer et al.

(10) Patent No.: US 9,403,324 B2
(45) Date of Patent: *Aug. 2, 2016

(54) METHOD FOR PRODUCING A PART USING A DEPOSITION TECHNIQUE

(71) Applicant: Voxeljet AG, Friedberg (DE)

(72) Inventors: Ingo Ederer, Pflaumdorf (DE); Rainer Hochsmann, Genderkingen (DE)

(73) Assignee: VOXELJET AG, Friedberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/292,961

(22) Filed: Jun. 2, 2014

(65) Prior Publication Data

US 2014/0322501 A1    Oct. 30, 2014

Related U.S. Application Data

(63) Continuation of application No. 10/381,546, filed as application No. PCT/DE00/03324 on Sep. 25, 2000, now Pat. No. 8,741,194.

(51) Int. Cl.
| | |
|---|---|
| *B22F 1/02* | (2006.01) |
| *B28B 1/16* | (2006.01) |
| *B29C 71/02* | (2006.01) |
| *B29C 67/00* | (2006.01) |

(Continued)

(52) U.S. Cl.
CPC ............. *B29C 67/0081* (2013.01); *B22C 1/162* (2013.01); *B22C 9/00* (2013.01); *B22C 9/10* (2013.01); *B22C 23/00* (2013.01); *B22F 3/008* (2013.01); *B29C 71/009* (2013.01); *Y02P 10/292* (2015.11); *Y10T 428/24893* (2015.01)

(58) Field of Classification Search
CPC .......... B22C 1/162; B22F 1/02; B22F 3/008; B28B 1/16; B29C 67/0081; B29C 71/009; B29C 71/02
USPC ............ 264/113, 219, 236; 164/16, 520, 525, 164/526, 527, 528, 529; 419/23, 61, 64, 65
See application file for complete search history.

(56) References Cited

U.S. PATENT DOCUMENTS

| | | | |
|---|---|---|---|
| 2,640,629 | A | 6/1953 | McDonald et al. |
| 2,692,142 | A | 10/1954 | Hunter |

(Continued)

FOREIGN PATENT DOCUMENTS

| | | |
|---|---|---|
| AU | 720255 B2 | 5/2000 |
| DE | 4300478 C1 | 8/1994 |

(Continued)

OTHER PUBLICATIONS

International Search Report, PCT/DE00/03324, dated May 6, 2001.

(Continued)

*Primary Examiner* — Leo B Tentoni
(74) *Attorney, Agent, or Firm* — The Dobrusin Law Firm, P.C.

(57) ABSTRACT

The invention relates to a method for producing a part using a deposition technique. A layered composite is built up in layers, the individual layers each containing particulate material and binding material as well as optionally, a treatment agent. The layers maintain a predetermined porosity. The layer composite is built up in the absence of hardening agent. Once construction is complete, the layer composite is hardened.

21 Claims, 2 Drawing Sheets

(51) Int. Cl.
- *B29C 71/00* (2006.01)
- *B22F 3/00* (2006.01)
- *B22C 1/16* (2006.01)
- *B22C 9/00* (2006.01)
- *B22C 9/10* (2006.01)
- *B22C 23/00* (2006.01)

(56) References Cited

U.S. PATENT DOCUMENTS

| | | | |
|---|---|---|---|
| 2,857,938 | A | 10/1958 | Wahl |
| 3,616,969 | A | 11/1971 | Koizumi |
| 3,616,972 | A | 11/1971 | Christy |
| 3,815,527 | A | 6/1974 | Dobbins |
| 3,879,339 | A | 4/1975 | Richard |
| 3,880,687 | A * | 4/1975 | Elmendorf et al. ....... 264/113 X |
| 3,913,503 | A | 10/1975 | Becker |
| 4,203,674 | A | 5/1980 | Laleman |
| 4,239,715 | A | 12/1980 | Pratt |
| 4,247,508 | A | 1/1981 | Housholder |
| 4,279,949 | A | 7/1981 | Esser |
| 4,369,025 | A | 1/1983 | Von der Weid |
| 4,575,330 | A | 3/1986 | Hull |
| 4,630,755 | A | 12/1986 | Campbell |
| 4,665,492 | A | 5/1987 | Masters |
| 4,669,634 | A | 6/1987 | Leroux |
| 4,752,352 | A | 6/1988 | Feygin |
| 4,863,538 | A | 9/1989 | Deckard |
| 4,876,294 | A | 10/1989 | Shriver et al. |
| 4,889,433 | A | 12/1989 | Pratt |
| 4,938,816 | A | 7/1990 | Beaman et al. |
| 4,944,817 | A | 7/1990 | Bourell et al. |
| 5,017,753 | A | 5/1991 | Deckard |
| 5,053,090 | A | 10/1991 | Beaman et al. |
| 5,059,266 | A | 10/1991 | Yamane et al. |
| 5,076,869 | A | 12/1991 | Bourell et al. |
| 5,127,037 | A | 6/1992 | Bynum |
| 5,132,143 | A | 7/1992 | Deckard |
| 5,134,569 | A | 7/1992 | Masters |
| 5,136,515 | A | 8/1992 | Helinski |
| 5,140,937 | A | 8/1992 | Yamane et al. |
| 5,147,587 | A | 9/1992 | Marcus et al. |
| 5,149,548 | A | 9/1992 | Yamane et al. |
| 5,155,324 | A | 10/1992 | Deckard et al. |
| 5,156,697 | A | 10/1992 | Bourell et al. |
| 5,182,170 | A | 1/1993 | Marcus et al. |
| 5,204,055 | A | 4/1993 | Sachs et al. |
| 5,216,616 | A | 6/1993 | Masters |
| 5,221,539 | A | 6/1993 | Pallerberg et al. |
| 5,248,456 | A | 9/1993 | Evans et al. |
| 5,252,264 | A | 10/1993 | Forderhase et al. |
| 5,284,695 | A | 2/1994 | Barlow et al. |
| 5,296,062 | A | 3/1994 | Bourell et al. |
| 5,316,580 | A | 5/1994 | Deckard |
| 5,340,656 | A | 8/1994 | Sachs et al. |
| 5,342,919 | A | 8/1994 | Dickens, Jr. et al. |
| 5,352,405 | A | 10/1994 | Beaman et al. |
| 5,354,414 | A | 10/1994 | Feygin |
| 5,382,308 | A | 1/1995 | Bourell et al. |
| 5,387,380 | A | 2/1995 | Cima et al. |
| 5,431,967 | A | 7/1995 | Manthiram et al. |
| 5,433,520 | A | 7/1995 | Adams |
| 5,482,659 | A | 1/1996 | Sauerhoefer |
| 5,490,962 | A | 2/1996 | Cima et al. |
| 5,506,607 | A | 4/1996 | Sanders, Jr. et al. |
| 5,518,680 | A | 5/1996 | Cima et al. |
| 5,554,330 | A | 9/1996 | Flannery et al. |
| 5,555,176 | A | 9/1996 | Menhennett et al. |
| 5,573,055 | A | 11/1996 | Melling et al. |
| 5,597,589 | A | 1/1997 | Deckard |
| 5,601,868 | A | 2/1997 | Gerhardt |
| 5,616,294 | A | 4/1997 | Deckard |
| 5,639,070 | A | 6/1997 | Deckard |
| 5,639,402 | A | 6/1997 | Barlow et al. |
| 5,647,931 | A | 7/1997 | Retallick et al. |
| 5,658,412 | A | 8/1997 | Retallick et al. |
| 5,730,925 | A | 3/1998 | Wilkening et al. |
| 5,753,274 | A | 5/1998 | Wilkening et al. |
| 5,807,437 | A | 9/1998 | Sachs et al. |
| 5,851,465 | A | 12/1998 | Bredt |
| 5,902,441 | A | 5/1999 | Bredt et al. |
| 5,902,537 | A | 5/1999 | Almquist et al. |
| 5,934,343 | A | 8/1999 | Gaylo et al. |
| 5,943,235 | A | 8/1999 | Earl et al. |
| 5,965,170 | A | 10/1999 | Matsuoka et al. |
| 6,007,318 | A | 12/1999 | Russell et al. |
| 6,036,777 | A | 3/2000 | Sachs |
| 6,037,389 | A | 3/2000 | Archibald et al. |
| 6,042,774 | A | 3/2000 | Wilkening et al. |
| 6,048,188 | A | 4/2000 | Hull et al. |
| 6,094,994 | A | 8/2000 | Satake et al. |
| 6,116,517 | A | 9/2000 | Heinzl et al. |
| 6,133,353 | A | 10/2000 | Bui et al. |
| 6,146,567 | A | 11/2000 | Sachs et al. |
| 6,147,138 | A | 11/2000 | Hochsmann et al. |
| 6,155,331 | A | 12/2000 | Langer et al. |
| 6,165,406 | A | 12/2000 | Jang et al. |
| 6,193,922 | B1 | 2/2001 | Ederer |
| 6,217,816 | B1 | 4/2001 | Tang |
| 6,258,170 | B1 | 7/2001 | Somekh et al. |
| 6,259,962 | B1 | 7/2001 | Gothait |
| 6,286,585 | B1 | 9/2001 | Twardowska et al. |
| 6,305,769 | B1 | 10/2001 | Thayer et al. |
| 6,316,060 | B1 | 11/2001 | Elvidge et al. |
| 6,322,728 | B1 | 11/2001 | Brodkin et al. |
| 6,355,196 | B1 | 3/2002 | Kotnis et al. |
| 6,375,874 | B1 | 4/2002 | Russell et al. |
| 6,401,001 | B1 | 6/2002 | Jang et al. |
| 6,403,002 | B1 | 6/2002 | Van der Geest |
| 6,416,850 | B1 | 7/2002 | Bredt et al. |
| 6,423,255 | B1 | 7/2002 | Hoechsmann et al. |
| 6,436,334 | B1 | 8/2002 | Hattori et al. |
| 6,460,979 | B1 | 10/2002 | Heinzl et al. |
| 6,467,525 | B2 | 10/2002 | Herreid et al. |
| 6,476,122 | B1 | 11/2002 | Leyden |
| 6,500,378 | B1 | 12/2002 | Smith |
| 6,552,130 | B1 | 4/2003 | Makino et al. |
| 6,554,600 | B1 | 4/2003 | Hofmann et al. |
| 6,596,224 | B1 | 7/2003 | Sachs et al. |
| 6,610,429 | B2 | 8/2003 | Bredt et al. |
| 6,733,528 | B2 | 5/2004 | Abe et al. |
| 6,764,636 | B1 | 7/2004 | Allanic et al. |
| 6,830,643 | B1 | 12/2004 | Hayes |
| 6,838,035 | B1 | 1/2005 | Ederer et al. |
| 7,004,222 | B2 | 2/2006 | Ederer et al. |
| 7,137,431 | B2 | 11/2006 | Ederer et al. |
| 7,204,684 | B2 | 4/2007 | Ederer et al. |
| 8,741,194 | B1 | 6/2014 | Ederer et al. |
| 2001/0050031 | A1 | 12/2001 | Bredt et al. |
| 2002/0026982 | A1 | 3/2002 | Bredt et al. |
| 2002/0111707 | A1 | 8/2002 | Li et al. |
| 2003/0083771 | A1 | 5/2003 | Schmidt |
| 2004/0012112 | A1 | 1/2004 | Davidson et al. |
| 2004/0025905 | A1 | 2/2004 | Ederer et al. |
| 2004/0026418 | A1 | 2/2004 | Ederer et al. |
| 2004/0035542 | A1 | 2/2004 | Ederer et al. |
| 2004/0038009 | A1 | 2/2004 | Leyden et al. |
| 2004/0056378 | A1 | 3/2004 | Bredt et al. |
| 2004/0094058 | A1 | 5/2004 | Kasperchik et al. |
| 2004/0145088 | A1 | 7/2004 | Patel et al. |
| 2004/0170765 | A1 | 9/2004 | Ederer et al. |
| 2005/0017394 | A1 | 1/2005 | Hochsmann et al. |
| 2005/0093194 | A1 | 5/2005 | Oriakhi et al. |
| 2005/0167872 | A1 | 8/2005 | Tsubaki et al. |
| 2006/0105102 | A1 | 5/2006 | Hochsmann et al. |
| 2006/0108090 | A1 | 5/2006 | Ederer et al. |
| 2006/0175346 | A1 | 8/2006 | Ederer et al. |
| 2006/0237159 | A1 | 10/2006 | Hochsmann |
| 2008/0001331 | A1 | 1/2008 | Ederer |
| 2008/0233302 | A1 | 9/2008 | Elsner |
| 2008/0237933 | A1 | 10/2008 | Hochsmann et al. |
| 2008/0260945 | A1 | 10/2008 | Ederer et al. |
| 2009/0261497 | A1 | 10/2009 | Ederer et al. |
| 2010/0212584 | A1 | 8/2010 | Ederer et al. |

(56) References Cited

U.S. PATENT DOCUMENTS

| | | |
|---|---|---|
| 2010/0243123 A1 | 9/2010 | Ederer et al. |
| 2010/0244301 A1 | 9/2010 | Ederer et al. |
| 2010/0272519 A1 | 10/2010 | Ederer et al. |
| 2010/0291314 A1 | 11/2010 | Kashani-Shirazi |
| 2011/0223437 A1 | 9/2011 | Ederer et al. |
| 2011/0308755 A1 | 12/2011 | Hochsmann |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0306379 A1 | 10/2014 | Hartmann et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |

FOREIGN PATENT DOCUMENTS

| | | |
|---|---|---|
| DE | 4325573 | 2/1995 |
| DE | 29506204.5 | 4/1995 |
| DE | 4400523 | 7/1995 |
| DE | 4440397 | 9/1995 |
| DE | 29701279 | 1/1997 |
| DE | 19545167 A1 | 6/1997 |
| DE | 19511772 | 9/1997 |
| DE | 19723892 | 9/1998 |
| DE | 19846478 | 4/2000 |
| DE | 19853834 | 5/2000 |
| DE | 10047614 | 4/2002 |
| DE | 10216013 A1 | 4/2002 |
| DE | 10117875 | 1/2003 |
| DE | 69634921 T2 | 12/2005 |
| EP | 0711213 B1 | 5/1995 |
| EP | 0361847 | 11/1995 |
| EP | 0431924 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0968776 | 10/2002 |
| EP | 1415792 | 5/2004 |
| EP | 1442870 | 8/2004 |
| FR | 2790418 | 9/2000 |
| GB | 2382798 | 6/2003 |
| WO | 95/18715 | 7/1995 |
| WO | 96/05038 | 2/1996 |
| WO | 00/03324 | 1/2000 |
| WO | 00/21736 | 4/2000 |
| WO | 00/51809 A1 | 9/2000 |
| WO | 01/26885 | 4/2001 |
| WO | 01/72502 | 4/2001 |
| WO | 01/34371 | 5/2001 |
| WO | 02/26419 | 4/2002 |
| WO | 02/26420 | 4/2002 |
| WO | 02/26478 | 4/2002 |
| WO | 02/28568 | 4/2002 |
| WO | 02/064353 | 8/2002 |
| WO | 02/064364 | 8/2002 |
| WO | 02/083323 | 10/2002 |
| WO | 03/016030 | 2/2003 |
| WO | 03/016067 A2 | 2/2003 |
| WO | 03/086726 | 10/2003 |
| WO | 03/097518 | 11/2003 |
| WO | 03/103932 | 12/2003 |
| WO | 2004/010907 A1 | 2/2004 |
| WO | 2004/110719 A2 | 12/2004 |
| WO | 2004/112988 | 12/2004 |
| WO | 2005/080010 | 9/2005 |
| WO | 2005/082603 A1 | 9/2005 |
| WO | 2005/113219 | 12/2005 |

OTHER PUBLICATIONS

International Search Report, PCT/DE01/03662, dated Jan. 3, 2002.
International Search Report, PCT/DE01/03661, dated Feb. 28, 2002.
International Search Report, PCT/DE01/01103, dated Sep. 30, 2002.
Copending National Phase Application, WO 02/28568, dated Apr. 11, 2002 with English Translation.
Copending National Phase Application, WO 02/26478, dated Apr. 4, 2002 with English Translation.
Copending National Phase Application, WO 02/26420, dated Apr. 4, 2002 with English Translation.
Copending National Phase Application, WO 02/083323, dated Oct. 24, 2001 with Enalish Translation.
Copending National Phase Application, WO 03/103932, dated Dec. 18, 2003.
Copending National Phase Application, WO 03/086726, dated Oct. 17, 2005.
Copending National Phase Application, WO 04/112988, dated Dec. 8, 2005.
Copending National Phase Application, WO 05/080010, dated Sep. 1, 2005.
EOS Operating Manual for Laser Sintering Machine with Brief Summary.
Sachs et al., "Three Dimensional Printing: Rapid Tooling and Prototypes Directly from a CAD Model", Massachusetts Institute of Technology, pp. 143-151, Jan. 1990.
Sachs et al., "Three-Dimensional Printing: Rapid Tooling and Prototypes Directly from a CAD Model", Massachusetts Institute of Technology, pp. 131-136.
Williams, "Feasibility Study of Investment Casting Pattern Design by Means of Three Dimensional Printing", Department of Mechanical Engineering, pp. 2-15, Jun. 5, 1989.
EOS Operating Manual for Laser Sintering Machine, Part 1 with Brief Summary, Feb. 22, 2005.
EOS Operating Manual for Laser Sintering Machine, Part 2 with Brief Summary, Feb. 22, 2005.
Gephart, Rapid Prototyping, pp. 118-119, 1996.
International Search Report, WO 04/110719, Jan. 11, 2005.
Marcus et al., Solid Freeform Fabrication Proceedings, Nov. 1993.
Opposition of Patent No. DE10047614, Jun. 25, 2003.
Opposition to European Patent No. 1322458 B1, Jan. 19, 2005.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Copending National Phase Application, WO 05/113219, Dec. 1, 2005.
Marcus, et al., Solid Freeform Fabrication Proceedings, Sep. 1995, p. 130-33.
US 4,937,420, 6/1990, Deckard (withdrawn).
Cima et al., "Computer-derived Microstructures by 3D Printing: Bio- and Structural Materials," SFF Symposium, Austin, TX, 1994.

(56) References Cited

OTHER PUBLICATIONS

Copending National Phase Application, WO 03/097518, Jun. 24, 2005(Published as 2006/0176346).
Copending National Phase Application, WO 05/113219, Dec. 1, 2005 (Published as 2008/0233302).
Copending U.S. Appl. No. 10/866,205, (Published as 2005/0017394), Jun. 11, 2004 (Published as 2008/02379331).
Copending U.S. Appl. No. 11/767,778, filed Jun. 25, 2007 (Published as 2008-0001331), Jun. 25, 2007.
Copending U.S. Appl. No. 11/320,050 (corresponds with PCT WO 02/26420), (U.S. Pat. No. 7,137,431),Dec. 28, 2005.
Machine Translation of PCT/DE07/01372.
Co-pending Office Action of U.S. Appl. No. 12/377,137, filed Jun. 18, 2010 as received on Feb. 21, 2013.

* cited by examiner

METHOD FOR PRODUCING A PART USING A DEPOSITION TECHNIQUE

This application is a continuation patent applications of U.S. patent application Ser. No. 10/381,546, filed on Aug. 7, 2003, now U.S. Pat. No. 8,741,194 B1, issued on Jun. 3, 2014. This application claims the benefit of priority of U.S. patent application Ser. No. 10/381,546 and PCT International Patent Application PCT/DE00/03324 filed on Sep. 25, 2000.

This invention relates to a method for producing a part in layers using a deposition technique to build a layered composite containing the part made of a particulate matter. The part produced is either a casting mould or core. The method is also suitable for manufacturing a metal part from a particulate metallic material, such as a metal powder or a granular synthetic material.

A conventional method for producing patterns and/or cores for metal casting utilizes a mixture of sand with a hardening binder filled in a box. A positive pattern for making the metal casting is embedded in the sand-binder mixture prior to its curing and is then removed again. This leaves an impression in the sand-binder mixture, which represents a negative pattern of the casting. The pattern of the sand-binder mixture is cured such that an adequately resistant mould of the negative pattern is produced.

Another alternative approach for manufacturing castings utilizes either a mixture of sand and binder also called Croning sand, which is a particulate matter made of moulding sand, such as quarts or zircon sand, pre-coated with a synthetic resin.

The bonding of the particulate matter is achieved by smelting the dry binder with applied heat. The attendant energy required for making the casting cores or moulds is thus not insignificant. Besides, the method requires use of relatively complex machines.

Cold curing techniques, such as the Cold Box method, are advantageous, in terms of energy savings for pattern fabrication. Here, the binder is cored chemically. This is done either with the addition of a cold-curing dual-component binder into the moulding sand, which remains workable for a limited time period before it hardens, or the pattern from the sand-binder mixture is alternatively flooded with a curing gas that cures the binder. The latter is referred to as a gas curing technique.

Conventional pattern making methods as described above then finish the positive pattern in an NC milling machine or NC lathe, which is especially time-consuming and expensive with increasing complexity of the desired metal part.

With a layered deposition technique, also called rapid prototyping in which the pattern making material is deposited in layers, it is possible to produce the castings, moulds, or other parts faster and more cost-effectively.

A known method for building a part in layers is described in U.S. Pat. No. 5,182,170 (Marcus et al). In this method, a layer of a binder-containing powder is deposited on a base. This layer is then subjected to a reactive gas atmosphere, which activates the binder. In this activating atmosphere, a predefined subarea of the layer is heated locally. The reactive gas and the added heat interact with the binder, initiating a localized chemical reaction of the binder leading to consolidation of the layer in the particular location. A laser, for example, could be the heat source. The powder deposition and subsequent activation and consolidation are carried out layer-by-layer until the part is finished.

Another layer deposition technique is known from the patents U.S. Pat. No. 5,204,055 and EP-0 431 924 B1 (Sachs et al). In this method, a layer of a particulate building material (e.g. ceramic or metal) is deposited. Through selective application of a self-curing binder in a predefined subarea of each layer, the building layer is bonded in the selected area and also bonded to the previously formed layer, before the next layer is deposited. This process is repeated in layers to produce a layered composite, in which the part to be made is contained within particulate matter is loose, since it has not been wetted with a binder. The binder can be applied as droplets through a printing technology device known as a Drop-On-Demand dispensing head, such as an inkjet print head, which is guided in a controlled manner by a predetermined program. The predefined subarea of each layer is consolidated at least partially, through application of heat radiation or by a chemical reaction of the binder, prior to deposition of the subsequent layer. Following building of the layered composite, post-treatment with applied heat can be conducted to fully consolidate all subareas forming the part.

A problem with the EP-0 431 92 4 B1 (Sachs) method relates to the binder's self-curing property, which can affect the cohesion between successive layers. Additionally, the binder in the Drop-On-Demand print head tends to cure and block the print head, making frequent cleaning of the print head necessary.

A rapid prototyping method described in DE 19853834.0 (Höchsmann et al.) involves depositing a layer of a particulate matter, the entire surface of which is then covered with a binder. Prior to depositing the next layer, a curing agent is applied to selected subareas of the layer treated with a binder, whereby the binder hardens in those selected subareas. The curing agent is, for instance, applied with a Drop-On-Demand print head. The curing agent does not harden without the binder, and thereby the print head nozzles do not get blocked with a hardening material. A layered composite comprised of many layers is accordingly built layer-by-layer.

Another rapid prototyping method is described in DE 197 23 892.0 (Höchsmann et al.), in which a layer of a packable particulate building material is first deposited on particles pre-coated with a curable binder. The building material could, for example, be Croning sand. A treatment agent is applied to selected subareas of each layer, which modifies the curing reactivity of the binder within the binder coating. Before deposition of the subsequent layer, energy with a given level of specific energy is then applied to this layer. This energy level is selected to match the modified curing reactivity of the binder achieved with the treatment agent, such that the binder cures in only the locations treated with the treatment agent. Each layer is accordingly cured before the next layer is added.

This invention fulfils the requirement to provide a rapid prototyping method for manufacturing parts, in particular casting moulds and cores, which is cost-effective and combines high manufacturing speed with fabrication precision.

According to the invention, in the method for producing a part in layers using a deposition technique by building a layered composite containing the part made of particulate matter comprised of particles of a prescribed particle size, the particulate matter is deposited layer-by-layer to form, successive layers of a porous bulk, and in at least one predefined subarea of each layer, which subarea could vary from layer to layer, and prior to deposition of the subsequent layer a treatment agent in a free-flowing state is apportioned on each layer. The treatment fluid sets up a bonding process, in which the particles in the predefined subareas bond firmly to one another, through the binder contained either in the particulate matter or deposited thereon, in the presence of an initiator.

According to the invention, however, the layered composite is built in the absence of an initiator. This initiator is added only after the layered composite has been completed, such that the bonding process is executed only after completion of the layered composite.

For the known methods described above, appropriate actions are necessary to always ensure that each predefined subarea of each layer is consolidated at least partially through bonding of the binder immediately following deposition of a layer and prior to deposition of the next layer. During the course of the invention, however, it was surprisingly discovered that even partial consolidation of the predefined subarea may not be required, if an effort is made to prevent the free-flowing treatment agent from flowing and spreading out beyond or at least not far beyond the boundaries of the predefined subarea into the surrounding untreated particulate matter. This can be achieved especially through appropriate limitation of the treatment agent dosage by matching it to the volume of the predefined subarea as determined from its surface area, layer thickness, and particle size, and therewith the porosity of the particulate matter and its wettability depending on the flow characteristics of the treatment agent.

According to the invention, bonding of the particulate matter particles in the predefined subareas is also achieved with a binder. In the primary embodiment of the method, it could be the binder itself that functions as the treatment agent, in the form of a free-flowing powder or a liquid, apportioned over the predefined subareas.

In another embodiment of the method, the binder can be applied on the deposited layer before or after application of the treatment agent over the full surface, or the binder can be mixed with the particulate matter prior to its deposition, or at least the majority of the particulate matter particles are pre-coated with the binder. In this embodiment of the method, the treatment agent is selected such that it modifies the key binding property of the binder from a specific initial value or initial range of values, as determined prior to application of the treatment agent, to a markedly different value or range of values. Hereafter, this key specific property of the binder will be designated in terms of its reactivity. In this second embodiment of the method, the reaction effectiveness of the initiator is adjusted and set according to the modified reactivity of the binder, such that the unmodified binder reacts selectively and bonds either to the areas outside of the predefined subareas treated with the treatment agent, or to the predefined subareas in which the binder is modified through its contact with the treatment agent. The treatment agent could thus be a liquid like hydrochloric acid or such that soaks into the dry binder or alters its composition and thereby makes it more amenable for bonding through application of energy or a chemical reaction, compared with the untreated binder. For example, the smelting point or range could be lowered by a given amount with an appropriately selected treatment agent, such that when the temperature of the subsequently applied initiator lies between the smelting points of an unmodified and a modified binder, selective smelting of the modified binder can be induced. Another possibility is that the treatment agent is a chemical catalyst or an inhibitor, with which the modified binder's chemical reactivity for chemical bonding or a curing reaction with a chemical gas or fluid, depending on its concentration and temperature, is increased or reduced by the given amount.

In this second embodiment of the method, it is preferred to use a particulate matter pre-coated with the binder, such as Croning sand. This sand contains a minimal quantity of a binder enveloping each particle, making it essentially necessary to apply the treatment agent only in a quantity adequate to attain appropriate wetting of the sheathing at the reciprocal contact points of the particles.

The initiator could be an immaterial medium like energy in the form of heat or radiation. The initiator could also be a material medium like a liquid or gaseous heat transfer agent or chemical reaction agent. The binder is preferably cured chemically calling for the use of a heating or a chemical curing agent that leads to linkage of the binder. The initiator could also be an energy medium and a material liquid at the same time.

It is preferred to apply the treatment agent on to the particulate matter, deposited as a porous bulk with a particle size dependent porosity, such that the predetermined minimum porosity is maintained in the predefined subareas, which can then be exploited to finally flood the layered composite with a liquid or gaseous initiator. Such flooding of the layered composite could possibly be promoted and aided by evacuating the layered composite in an enclosed container prior to the flooding.

The method according to the invention has several advantages:

A bonding process and especially hardening of the binder can lead to shrinkage. If thermal bonding or hardening is implemented separately for each layer, stresses will be generated in the layered composite, which could lead to distortion or damage of the part. Since according to the invention, the bonding takes place at the end and not separately for each layer, if volumetric shrinkage occurs, the entire composite will shrink and become smaller overall, without generating any stresses. Any shrinkage can be compensated for through inclusion of an appropriate shrinkage mass when specifying the size of the relevant subarea for apportioned application of the treatment agent.

Since the bonding or curing is done after producing the whole layered composite and not after depositing each layer, no bonding step is required per layer and the fabrication time for each layer is accordingly reduced. Bonding of the layered composite requires just one single step at the end of the process, which also enhances the manufacturing speed.

Additional time is also saved, since there is no need to wait until each layer is bonded or particularly hardened.

Additionally, the final bonding of the layered composite can be executed at a location, other than where the layered composite is built, which thereby necessitates waiting only for building of the next layered composite rather than waiting for the former one to harden. Accordingly, the layered composite is built preferably in a container to hold the layered composite together without allowing it to fall apart both during building and after it is finished, and also for transporting it to the bonding location. During the bonding process, the layered composite could thus remain in the same container in which it was built.

Another advantage of this method is that the deposition devices for applying the binder and/or treatment agent cannot become blocked by curing agents.

Another advantage of the method according to the invention lies therein that the building material outside of the predefined subareas can remain untreated, thereby allowing it to be reused easily after being removed from the bonded part. Besides, when the building material is used in an uncoated form, cleaning of the deposition devices utilized for the method becomes easy. Moreover, the method is more cost-effective, since the binder is deposited only on the spots where the part is subsequently formed.

The preferred building materials for a method to produce casting moulds and cores and for a deposition technique are typical sands such as quartz, silicate, chromite, olivine, or zircon sand. Any other appropriately packable particulate material, or a mixture of different sands can also be used.

For the above-described second embodiment of the method, it is preferred to use pretreated sand, such as Croning sand precoated with a binder.

Untreated materials have the advantage that they are more cost-effective than materials pre-treated with a binder.

The prescribed particle sire, which is the size of the sand grains in the case of sand, lies preferably in the particle size range from 90 to 200 µm, and therein preferably in the range of 110 to 160 µm. It is also possible to use smaller or larger particles. Air movements, however, easily affect very small particles, thereby hampering homogeneous deposition of the particles. Small particles additionally reduce the porosity and impact the gas blast when pouring. On the contrary, extra large particles result in undesirable surficial graininess of the finished part. Typically, the median particle diameter or average particle size is approximately 140 µm. Normally not all particles are of the same size, but instead exhibit a certain sire distribution. The preferred quartz sand has an average grain or particle size of 140 µm, with approximately 5% of the grains ranging from 180 to 200 µm in size, 59% from 125 to 180 µm, 30% lying between 90 and 125 µm, and 1% of the grains being smaller than 63 µm. This type of quartz sand, as a building material, is typically deposited at a bulk density of 1.32 t/m$^2$.

The thickness of each layer of particulate material can vary. Thinner layers enable the part to be produced with a higher resolution of its design details. With very thin layers, however, reducing the layer thickness further does not result in any increase in the resolution, since process fluctuations limit the achievable resolution. Conversely, extremely thin layers result in lower fabrication speeds, since many layering steps become necessary. Thicker layers raise the achievable manufacturing speed, but all layer thicknesses are also not feasible. Very thick layers make it difficult to apply the treatment agent uniformly on the particulate matter, such that these work steps take longer and either the fabrication speed does not improve markedly with a greater layer thickness, or it may even drop. Besides, the application of thick layers results in poorer resolution of the part's design details. The preferred layer thickness is in the range of 0.15 to 0.30 mm, making it possible to not only attain a relatively high manufacturing speed, but also adequate cohesion between the successive layers and an appropriate resolution of the part's details.

The layer thickness can be varied during manufacturing of the part. Hence, to raise the fabrication speed thicker layers can be selected for areas of the part with fewer design details. In areas of the part with complicated and finer design details, the layer thickness can be lowered to enhance both the resolution and manufacturing precision.

The treatment agent is apportioned on to the previously deposited building material layer, such that the building material is just wetted, without any inhomogeneous distribution and local accumulation of the treatment agent, which would lower the performance of the part built according to this method.

The treatment agent and binder are applied in an amount such that the particle layer has a residual porosity, whereby the curing agent can penetrate into the part through these remaining pores during the subsequent curing stage.

The prescribed binder dosage is preferably selected to maintain a binder to building material weight ratio of less than 6%, and therein preferably between 2 and 3%. The amount of binder applied relative to the building material can vary from layer to layer.

It is preferred to select a similar weight ratio between the treatment agent and the building material.

If the part is a casting mould or core, the residual porosity of the bonded part that remains after hardening has the added effect that the gases formed under a subsequent casting process can escape. In such a situation, the binder and/or treatment agent are preferably apportioned such that, on the one hand, the pattern used to produce a casting out of a molten mass withstands the pressure of the molten mass, as long as it is not set, and on the other hand, at the point where the molten mass is partially solidified such that the casting is essentially stable, the binder and/or treatment agent should have almost vaporized. Once the casting has solidified, the pattern can be simply destroyed without any significant effort to remove it, as in a lost pattern process.

The binder and/or treatment, agent could be applied in a fluid state.

The liquid binder and/or treatment agent can, for example, be applied on the particle layer as a spray. However, it is preferred to apply the fluid binder and/or treatment agent as liquid binder droplets with a prescribed droplet diameter. The prescribed diameter of the binder and/or treatment agent droplets lies preferably in the size range from 50 to 100 µm. For droplets with a diameter of less than about 5 µm, anti-gravitational fractional forces of the air cannot be neglected, thereby making it difficult to dependably deposit the droplets on to the building material. Conversely, large drops result in inhomogeneous distribution of the liquid in the building material layer.

In such situations, the binder and/or treatment agent should be fluid enough to enable the prescribed dosage to be applied on to the building material layer and such that they utilize the capillary action in the particle interstices for spreading out and wetting the particles. Accordingly, the viscosity of the liquid binder and/or treatment agent is preferably in the range of 1 to 25 mPas, when applied. Additionally, in order that coloured patterns could also be produced, the binder could contain a colouring agent, especially a pigment, or alternatively it could impart a specific colour to the powdered material. Use of several different coloured binders, each specifically apportioned like the colour mixing done in an inkjet system, it becomes possible to make fully coloured patterns or ones with colour schemes, for manufacturing applications calling for interesting display patterns or quite realistic replicas.

The operating temperature for implementing this method is determined by the material properties, for instance the viscosity and smelting point of the building material, binder, or treatment agent used. The method is conducted preferably at temperatures between 10 and 40° C. It is additionally preferred to use a binder and/or treatment agent that allow the method to be conducted at room temperature, to minimize unnecessary equipment complications. Hence, the viscosity of the binder and/or treatment agent lies preferably in the stated range of 1 to 25 mPas at a temperature of 20° C.

When applied, the binder and/or treatment agent could be at the ambient temperature or alternatively slightly above that, to reduce the viscosity for eased distribution of the binder and/or treatment agent into the layer. The ambient temperature refers to the temperature in the immediate vicinity of the location where the part is produced, for example, the atmospheric temperature in the close environs thereof.

Alternatively, to promote distribution of the binder and/or treatment agent in the layer, the layer itself could be heated each time prior to applying the binder and/or treatment agent.

Instead of as a fluid, the binder and/or treatment agent could optionally be applied also as a fine powder with binder and/or treatment agent particles of a prescribed size. As such, the particle size of the binder and/or treatment agent should be smaller than that of the building material, in order that the binder and/or treatment agent particles can wet or envelop the building material particles. Copying machines, for example, successfully deposit fine particulate materials with a toner on to paper, just as sublimation printers apply coloured powders on paper. In a copying machine, the toner is fixed through heating, although the toner clings to the paper on being applied even without being fixed.

The liquid or particulate binder and/or treatment agent, for instance, could be applied with the known airless technique, in which a pure binder and/or treatment agent are squeezed under high pressure through a nozzle. Alternatively, the binder and/or treatment agent could be applied with the airbrushing technique, in which the binder and/or treatment agent are fed to a tip, where a fast moving air stream flowing by or alternatively a rotation technique sweeps it along. Alternatively, the treatment agent could be applied with an ultrasonic sprayer, in which a piezo-activated membrane generates droplets of the treatment agent, which can be targeted precisely with an air stream on to the predefined subarea of the building zone. With these techniques mentioned, the binder and/or treatment agent can be apportioned very precisely. The binder and/or treatment agent could alternatively be applied with a silkscreen printing technology or with a technique to spray on the binder and/or treatment agent through a mask. A particulate binder and/or treatment agent could alternatively be sprinkled on.

A Drop-On-Demand print head, operated for example through a bubble jet or a piezo technique, such as is known for an inkjet print head, is preferred for applying the fluid or particulate binder and/or treatment agent.

When applying a liquid binder and/or treatment agent, it is preferred to use a Drop-On-Demand print head for application at a droplet line density in the range of 300 to dpi.

The preferred material for the binder and/or treatment agent to be applied is at least one from the material group that includes sodium silicate, phenol resin, polyisocyanate, polyurethane, epoxy resin, furan resin, polyurethane polymer, peroxide, polyphenol resin, or resol ester.

A gas, a liquid, or a liquid vapour could be applied as the curing agent.

Once all the layers of the part to be produced are deposited and the binder and/or treatment agent have been applied, the liquid curing agent is flooded throughout the part. The curing agent penetrates through the residual pores of the part that remain after application of the binder and/or treatment agent.

In this way, the binder and the binder treated with the treatment agent are cured.

The curing can be accelerated through heating of the fluid and/or the complete part. If a heated vapour is applied when using vapour curing, the heat of the vapour could promote and/or accelerate the curing.

The preferred curing agent for application is at least a gas from the group of gases that includes carbon dioxide, dimethylethylamine, triethylamine, sulphur dioxide, methylformiate, formaldehyde-dimethylacetate, or isocyanate.

The appropriate binder and/or treatment agent are accordingly selected such that the resulting material combination is one with which the binder can be cured.

The following table lists some of the known binder and curing agent combinations, which can also be applied according to the invention:

TABLE 1

| Method | Binder | Curing Agent |
| --- | --- | --- |
| $CO_2$ | Sodium silicate | Carbon dioxide |
| Cold Box Polyurethane | Phenol resin and polyisocyanate | Dimethylethylamine or triethylamine |
| Cold Box Plus | Polyurethane | Dimethylethylamine |
| $SO_2$ | Furan resin and peroxide | Sulphur dioxide |
| FRC | Polyurethane polymer and peroxide | Sulphur dioxide |
| Pep Set | Polyphenol resin and an acid | Methylformiate |

The Cold Box Plus technique is normally conducted at a slightly elevated temperature of 65 to 70° C.

Nevertheless, other material combinations are feasible. When using an isocyanate as the bindery steam can be applied as the curing agent.

The method according to the invention is suited for producing different types of parts, such as design or construction models. It is preferred to apply the method to produce a casting mould or core, therein preferably a mould.

The preferred embodiment of the invention will now be explained in more detail with reference to the accompanying drawings, in which:

FIG. 1b illustrates the fully completed part of FIG. 1a, and

Figure 1B:
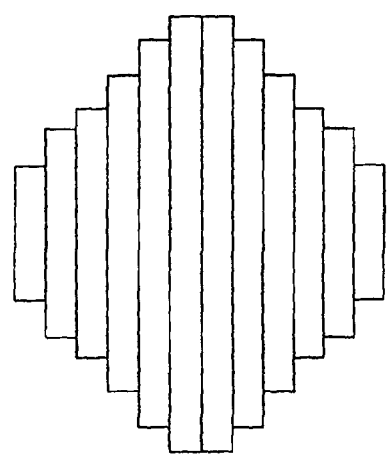
Figure 1A:
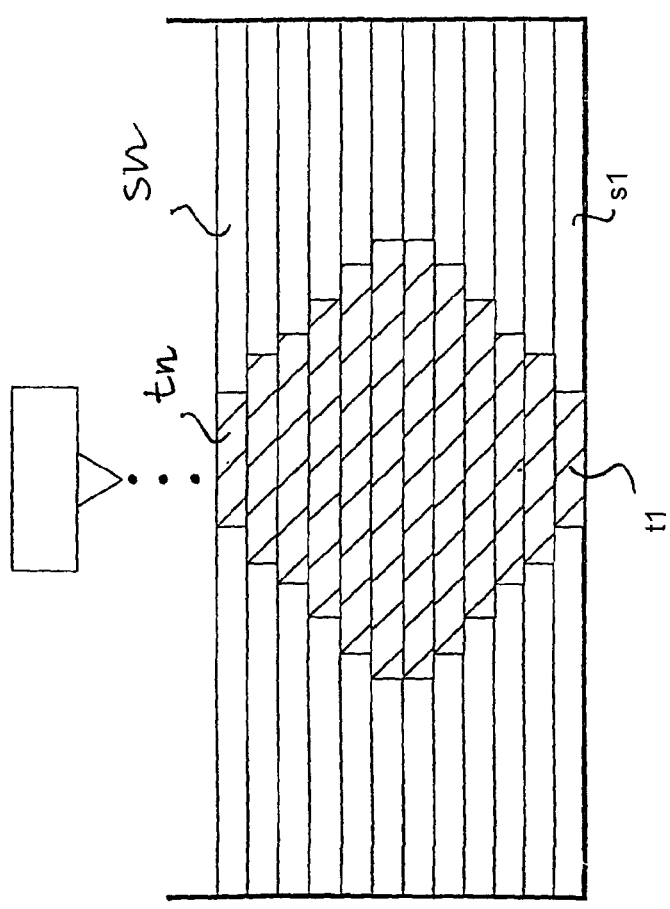
FIG. 1a is a schematic sectional representation of a part produced according to a preferred embodiment of the invention through the application of a binder and/or treatment agent.

FIG. 1a depicts a schematic sectional view of a part produced according to a preferred embodiment of the invention, such as a casting mould or core, through deposition of the binder, thereby illustrating the principle of the method. According to the method for building the part, a series of n layers are produced sequentially from s1 through sn. Accordingly, the first step involves depositing the first building layer s1 over the entire surface. In the next step, the binder and/or treatment agent are applied on a selected subarea t1 (hatched) of the first layer s1. These two steps are then repeated in sequence for the remaining layers s2 through sn. The subareas ti, tj for the different layers si, sj are generally different, but they at least overlap each other partially such that they are firmly bound to each other.

Once the binder and/or treatment agent have been applied on the last layer, the entire part is flooded with the curing agent and thereby hardened. As a helpful measure, the layered composite can be evacuated prior to application of the curing agent. Finally, the loose building material lying outside of the areas t1 to tn is removed, resulting in the finished part shown in FIG. 1b.

To produce a pattern with the method according to the invention, the building material is deposited as described above. Conversely, the binder and/or treatment agent are applied outside of the subareas ti, i=1 . . . n respectively. These areas outside ti are accordingly consolidated through final curing. Once the part has hardened, the loose particulate matter in the subareas ti, i=1 . . . n is re-moved, with the result that the remaining part reflects a hollow space in the shape of the body of FIG. 1b.

Figure 2:
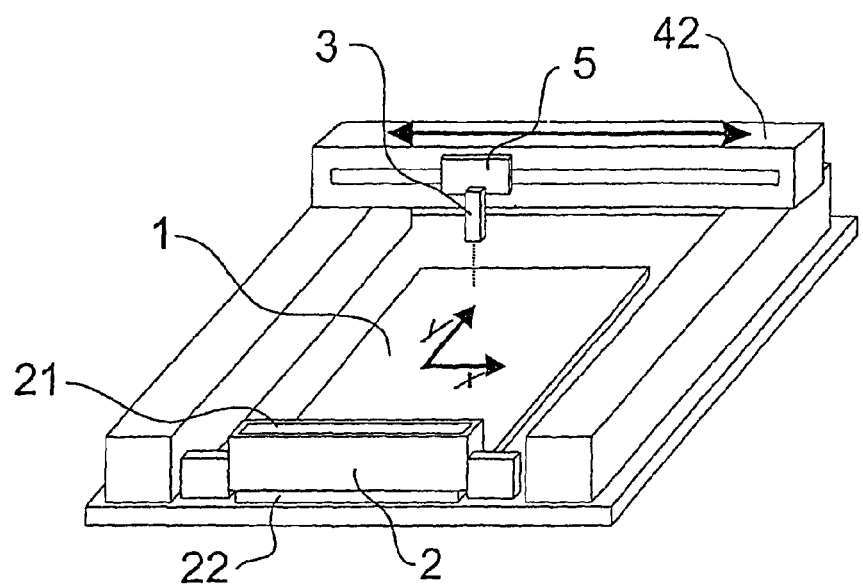
FIG. 2 shows a device for implementing the method according to the invention during operation of the dispensing head.

A device for producing parts according to a preferred embodiment of the invention is shown in FIG. 2. Such a device is comprised of the following components;

A vertically movable building platform 1,

A control mechanism,

A horizontally movable deposition device 2 steerable with the control mechanism, with which a packable building material can be deposited in layers on building platform 1 or on to a previous layer up to a prescribed layer thickness, and a horizontally movable dispensing head 3 arranged on a slide 42, which is steerable with the control mechanism and with which a liquid or particulate binder and/or treatment agent can be applied to a selected area of the layer.

The building material deposition device 2 is arranged with a long box 21, open above and below, designed for receiving and depositing the building material on to building platform 1 and on to the last deposited layer. In the vicinity of the lower open edge of box 21 facing building platform 1 is an outlet device 22 with an opening that can be adjustably opened or closed and which is arranged with coating blades. Deposition device 2 is movable at a settable velocity perpendicularly to the long direction of box 21, as depicted by axis y in FIG. 2, from one end of building platform 2 and back.

Slide 42 with dispensing head 3 for applying the binder is movable in a manner similar to the building material deposition device 2, Dispensing head 3 is movable perpendicularly, as depicted by axis x in FIG. 2, to the movement direction of slide 42, such that dispensing head 3 can be moved throughout the entire level above building platform 1.

This method is implemented with the device according to a preferred embodiment of the invention, as follows.

Deposition of building material layers:

On commencement of the procedure, deposition device 2 with box 21 filled with the building material, as shown in FIG. 2, is positioned at the initial edge of building platform 1. The outlet device 22 of box 21 is opened to deposit a strip of the building material. At the same time deposition device 2 is driven to the opposing edge of building platform 1 at a constant velocity, such that all of building platform 1 is covered with a uniform layer of the building material. Box 21 is thereby moved over building platform 1 in such a manner as to use its lower edge to smooth out the building material layer already deposited. The vertical position of building platform 1 with respect to box 21 is set such that the building material layer attains a predefined desired thickness, following smoothing out of the layer by the blade located on the lower edge of box 21. The velocity and/or the degree of opening of the deposition device 22 is accordingly preferably selected and set by the control mechanism such that precisely the amount of building material necessary to obtain the predefined layer thickness lands on building platform 1. As soon as deposition device 2 reaches the opposing edge of building platform 1, the material feeding process is interrupted.

Application of the binder and/or treatment agent:

Dispensing head 3, preferably a Drop-On-Demand dispensing head known from inkjet printers, is moved along a prescribed path over building platform 1, through movement of slide 42 relative to building platform 1 and through movement of dispensing head 3 relative to slide 42. Simultaneously, dispensing head 3 ejects the binder and/or treatment agent. This leads to creation of a pattern with the binder and/or treatment agent in the building material layer, which reflects the part's cross-section through the layer level.

The first layer is now complete and a second layer is to be deposited. Accordingly building platform 1 is moved a given distance downwards from the deposition device 2. A second layer of building material is then deposited and imparted a pattern with the binder and/or treatment agent.

Additional layers are made in the same way until a layered composite is fully built.

The layered composite is finally cured, preferably analogous to a conventional gas curing technique.

For example, following deposition of the last layer and application of the binder on to this layer, the layered composite is removed from the deposition device. The building platform can be removed along with the layered composite to provide support thereto. The layered composite is then transferred, possibly with the building platform, to a processing chamber. The processing chamber is then flooded with an appropriate gas to cure the layered composite.

Alternatively, the device for producing a part is integrated into a processing chamber, such that the layered composite can be cured directly therein.

The layers of the layered composite exhibit sufficient reciprocal cohesion, such that the uncured layered composite can be removed from the deposition device without problems.

However, the device can also have a building box in which the layers of the layered composite are produced such that the building box is filled up with the layers. The building box serves as a support means for the layered composite and reduces the danger of damage to the uncured layered composite, for instance during transport into a processing chamber for curing.

What is claimed is:

1. A method for producing a part layer-by-layer comprising the steps of:
   i. depositing a first layer of particulate matter into a building box having a build platform;
   ii. selectively applying a particulate binder to a predefined subarea of the layer so that the layer has treated particulate matter in the predefined subarea and untreated particulate matter outside of the predefined subarea, wherein the binder is a free-flowing powder;
   iii. providing support to both the treated particulate matter and the untreated particulate matter by the building box so that partial consolidation of the treated particulate matter is not required to prevent the treated particulate matter from flowing beyond the predefined subarea of the layer;
   iv. repeating steps i. through iii. until the part is complete, wherein the building platform provides support for the layered composite and reduces the danger of damage to the uncured layered composite;
   v. binding the particulate matter in the predefined subareas after step iv. is complete by heating the part so that the part is bonded, wherein the binding of the particulate matter particles in the predefined subareas is achieved with the binder;
   wherein the steps of depositing the layer of particulate material and applying the particulate binder are done in the absence of an initiator.

2. The method of claim 1, wherein the particulate material includes sand; and wherein no bonding step is provided per layer and bonding of the layers occurs only at the end of the process.

3. The method of claim 1, wherein the particulate matter outside of the predefined subarea remains untreated and is removed from the bonded part.

4. A method for producing a part layer-by-layer, comprising the steps of:
   i. depositing a first layer of particulate matter into a building box having building platform;
   ii. selectively applying a liquid binder to a predefined subarea of the layer so that the layer has treated particulate matter in the predefined subarea and untreated particulate matter outside of the predefined subarea, wherein the binder is applied in the form of liquid drops according to an inkjet or a drop-on-demand technique;

iii. providing support to both the treated particulate matter and the untreated particulate matter by the building box so that partial consolidation of the treated particulate matter is not required to prevent the treated particulate matter from flowing beyond the predefined subarea of the layer;

iv. repeating steps i. through iii. until the part is complete; wherein the building platform provides support for the layered composite and reduces the danger of damage to the uncured layered composite;

v. binding the particulate matter in the predefined subareas after step iv. is complete by heating the part so that the part is bonded, wherein binding of the particulate matter particles in the predefined subareas is achieved with the binder;

wherein the steps of depositing the layer of particulate material and applying the liquid binder are done in the absence of an initiator; and wherein no bonding step is provided per layer and bonding of the plurality of layers employs just one step at the end of the process.

5. The method of claim 4, wherein the liquid binder is selectively applied using an inket print head.

6. The method of claim 5, wherein the material outside of the predefined subarea remains untreated and is removed from the bonded part.

7. A method for producing a part layer-by-layer, comprising the steps of:
i. depositing a layer of material including a dry binder into a building box having a building platform;
ii. applying a treatment agent to a predefined subarea of the layer so that the treatment agent soaks into the dry binder and makes the treated binder more amenable for bonding through the application of heat compared with the untreated dry binder outside of the predefined subarea;
iii. repeating steps i. through ii. until the part is complete; wherein the building platform provides support for the layered composite and reduces the danger of damage to the uncured layered composite;
iv. curing the treated binder in the part after step iii. is complete by heating the part so that the part is bonded; and
wherein the steps of depositing the layer of particulate material and applying the dry binder are done in the absence of an initiator; and
wherein the binder is applied as a free-flowing powder; and no bonding step is provided per layer and bonding of the layers occurs only at the end of the process.

8. The method of claim 7, wherein the material including the dry binder is a particulate material having a coating of the binder.

9. The method of claim 7, wherein the material including the dry binder is a Croning sand.

10. The method of claim 7, wherein the step of depositing a layer of material including a dry binder includes depositing a material including a metal powder.

11. The method of claim 7, wherein the method includes a step of depositing a layer of particulate material prior to the step of depositing a layer of material including a dry binder.

12. The method of claim 7, wherein the material outside of the predefined subarea remains untreated and is removed from the bonded part.

13. The method of claim 7, wherein the treatment agent is a liquid.

14. The method of claim 7, wherein the treatment agent lowers the melting point or range of the binder.

15. The method of claim 7, wherein the step of curing includes heating to a temperature between the melting temperature of the untreated binder and the melting temperature of the treated binder for selectively melting the treated binder.

16. The method of claim 7, wherein the treatment agent increases the chemical reactivity of the binding material.

17. A method for producing a part layer-by-layer, comprising the steps of:
i. depositing a first layer of particulate matter into a building box having building platform;
ii. applying a resinous binder to a predefined subarea of the layer so that the layer has treated particulate matter in the predefined subarea and untreated particulate matter outside of the predefined subarea;
iii. providing support to both the treated particulate matter and the untreated particulate matter by the building box so that partial consolidation of the treated particulate matter is not required to prevent the treated particulate matter from flowing beyond the predefined subarea of the layer;
iv. repeating steps i. through ii. for depositing additional layers over the previously deposited layer until a multi-layered part is complete; and
v. curing the resinous binder in the part after step iv. is complete by flooding or flowing a gas curing agent through the part;
wherein the steps of depositing the layer of particulate material and applying the resinous binder are done in the absence of an initiator; and
wherein no bonding step is provided per layer and bonding of the layers occurs only at the end of the process.

18. The method of claim 17, wherein the particulate matter has a particle size range from 90 μm to 200 μm; and the gas curing agent is selected from carbon dioxide, dimethylethylamine, triethylamine, sulphur dioxide, methylformate, formaldehyde-dimethylacetate, or isocyanate.

19. The method of claim 7, wherein
the step of depositing a layer of material including a dry binder includes depositing a material including a metal powder;
the method includes a step of depositing a layer of particulate material prior to the step of depositing a layer of material including a dry binder; and
the material outside of the predefined subarea remains untreated and is removed from the bonded part.

20. The method of claim 19, wherein the treatment agent is a liquid; and
i) the treatment agent lowers the melting point or range of the binder; or
ii) the treatment agent increases the chemical reactivity of the binding material.

21. The method of claim 19, wherein the treatment agent is a liquid;
the treatment agent lowers the melting point or range of the binder; and the method includes heating the uncured layered composite to a temperature between the melting temperature of the untreated binder and the melting temperature of the treated binder for selectively melting the treated binder.

* * * * *